United States Patent [19]

Kitazato

[11] Patent Number: 5,173,771
[45] Date of Patent: Dec. 22, 1992

[54] MOTION DETECTING CIRCUIT FOR VIDEO IMAGE

[75] Inventor: Naohisa Kitazato, Kanagawa, Japan
[73] Assignee: Sony Corporation, Tokyo, Japan
[21] Appl. No.: 573,792
[22] Filed: Aug. 28, 1990

[30] Foreign Application Priority Data

Aug. 29, 1989 [JP] Japan .................................. 1-222395

[51] Int. Cl.⁵ .............................................. H04N 7/18
[52] U.S. Cl. .................................... 358/105; 358/136
[58] Field of Search ................ 358/105, 136, 133, 135

[56] References Cited

U.S. PATENT DOCUMENTS

| | | | |
|---|---|---|---|
| 4,313,159 | 1/1982 | Shoap | 395/425 |
| 4,464,726 | 8/1984 | Chiang | 358/24 |
| 4,667,233 | 5/1987 | Furukawa | 358/136 |
| 4,691,230 | 9/1987 | Kaneko et al. | 358/136 |
| 4,779,131 | 10/1988 | Matsumoto et al. | 358/105 |
| 4,811,092 | 3/1989 | Achiha et al. | 358/105 |
| 4,855,825 | 8/1987 | Santamaki et al. | 358/136 |
| 4,947,248 | 8/1990 | Hienerwadel et al. | 358/105 |
| 4,953,019 | 8/1990 | Skikakura et al. | 358/135 |
| 4,985,764 | 1/1991 | Sato | 358/105 |
| 5,030,953 | 7/1991 | Chiang | 358/105 |

Primary Examiner—James J. Groody
Assistant Examiner—Michael H. Lee
Attorney, Agent, or Firm—Hill, Van Santen, Steadman & Simpson

[57] ABSTRACT

A motion detecting circuit separates picture data of one frame into a plurality of image segments. The circuit includes a first memory for receiving picture data of current frame image and a second memory for receiving picture data of a previous or one frame delayed image. Each of the first and second memories comprises a plurality of memory areas separated into two blocks, and each individual memory area is adapted to store picture data for one image segment. The two memory blocks are operative in alternating fashion in reading and writing picture data. A plurality of arithmetic circuits are associated with the memory area to receive therefrom the picture data of each image segment and to process the received picture data for deriving a motion vector of each individual image segment.

7 Claims, 4 Drawing Sheets

MOTION DETECTING CIRCUIT FOR VIDEO IMAGE

BACKGROUND OF THE INVENTION

1. Field of the Invention

The present invention relates generally to a motion detecting circuit for video image. More specifically, the invention relates to a motion detecting circuit for a video image for deriving a motion vector in order to predict compensation of motion between frames.

2. Description of the Background-Art

Predictive coding is one approach to establish high efficiency coding of a television signal. One of predictive coding technologies is prediction of compensation of movement between adjacent frames. For performing this, it is necessary to accurately detect a motion vector. For deriving the motion vector, a motion detecting circuit is employed. The motion detecting circuit separates each frame of a video image into a predetermined number of image blocks so that a motion vector is detected for each image block. For deriving the motion vector, large amount of data needs to be processed. Therefore, for coding of a television signal in a range of several Mbps to several tens of Mbps, high speed and high efficiency data processing becomes necessary.

For this reason, it is necessary to provide a TTL circuit for the motion detecting circuit. This makes the circuit construction in large size.

SUMMARY OF THE INVENTION

Therefore, it is an object of the present invention to provide a motion detecting circuit for a video image, which permits reduction of the size of the circuitry.

According to one aspect of the invention, a motion detecting circuit for a video image comprises: a first buffer memory for storing picture data of a current image, the picture data being separated into a plurality of first component data representative of current image segments; a second buffer memory for storing picture data of a previous image, the picture data being separated into a plurality of second component data representative of previous image segment; and a plurality of arithmetic means for deriving motion vectors, each of the arithmetic means receiving the first component data and the corresponding second component data for deriving the vector data.

In the preferred construction, each of the arithmetic means comprises an absolute differential value calculating means, an accumulating circuit and a minimum value detecting circuit. Also, it is preferred that the first buffer memory stores data of the current frame image and the second buffer memory stores data of one frame delayed image.

The motion detecting circuit may further comprise a multiplexer connected to outputs of the plural calculation means, and an output buffer memory connected to the multiplexer. Furthermore, the motion detecting circuit may further comprise a first address change-over circuit connected to the first and second buffer memories, and a second address change-over circuit connected to the output buffer memory.

The motion detecting circuit may also comprise a controller connected to the first and second change-over circuits. In such case, the controller is supplied with synchronization signal which synchronizes the video signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

IN THE DRAWINGS

Figure 1:
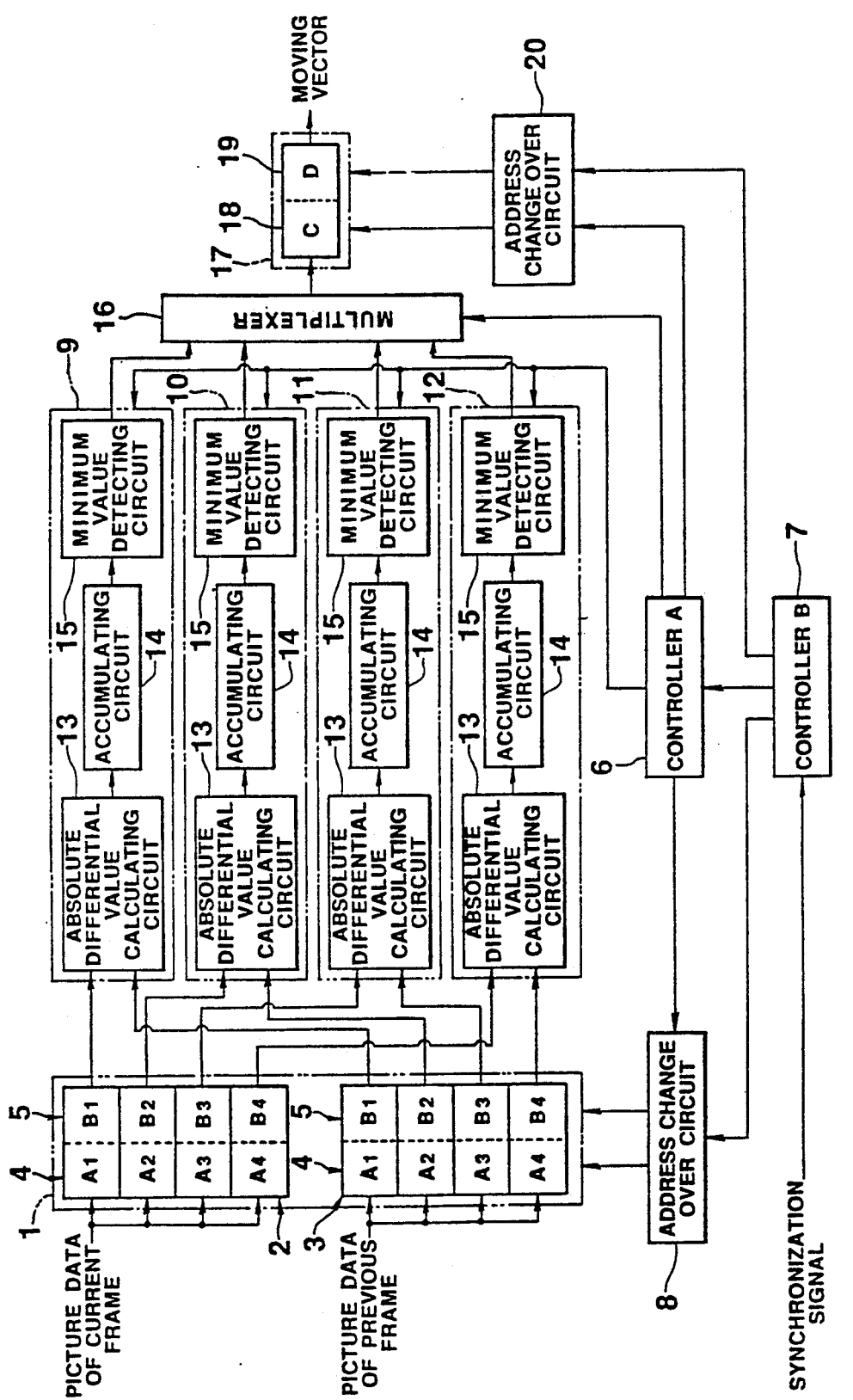
Figure 2:
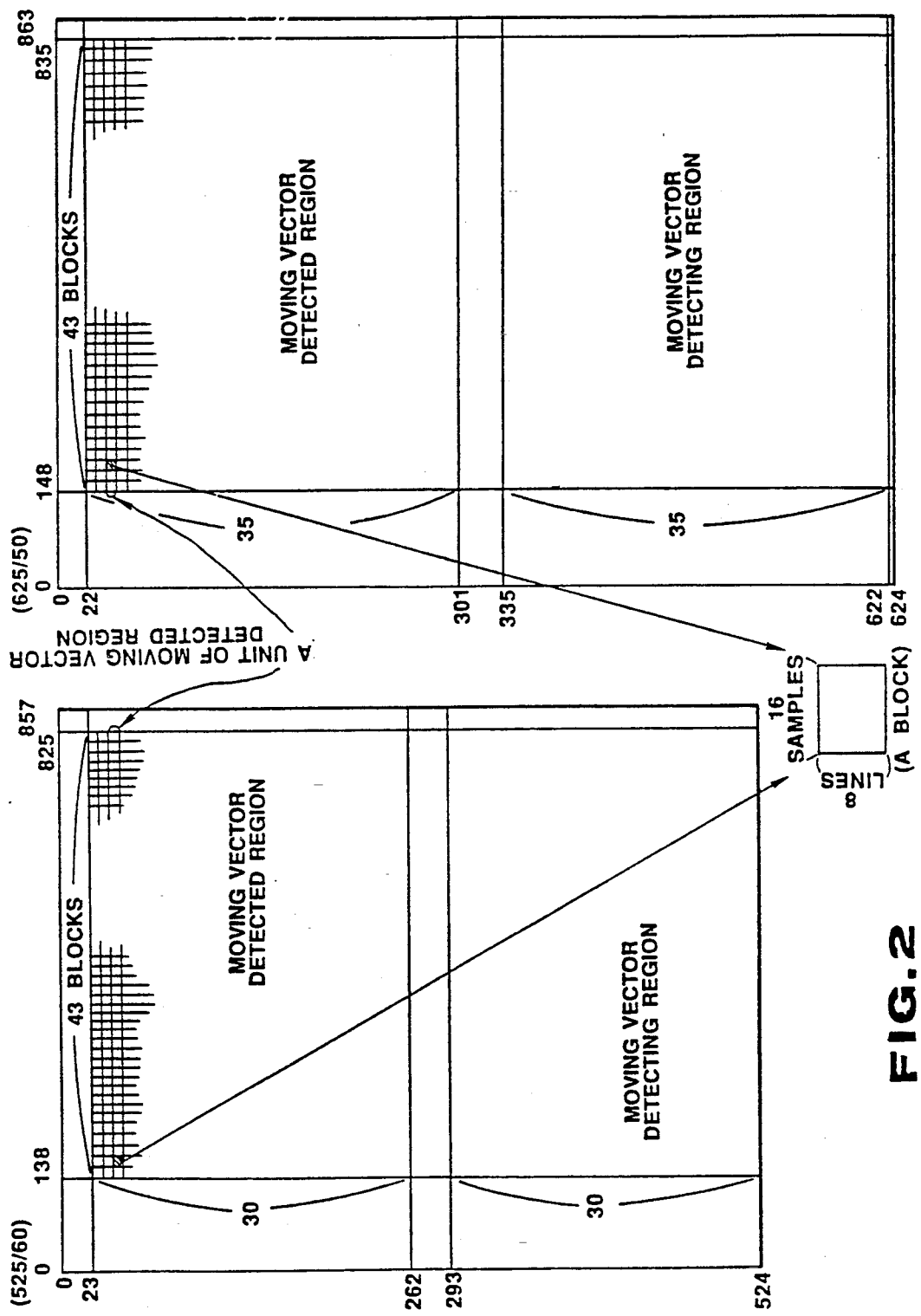
Figure 3:
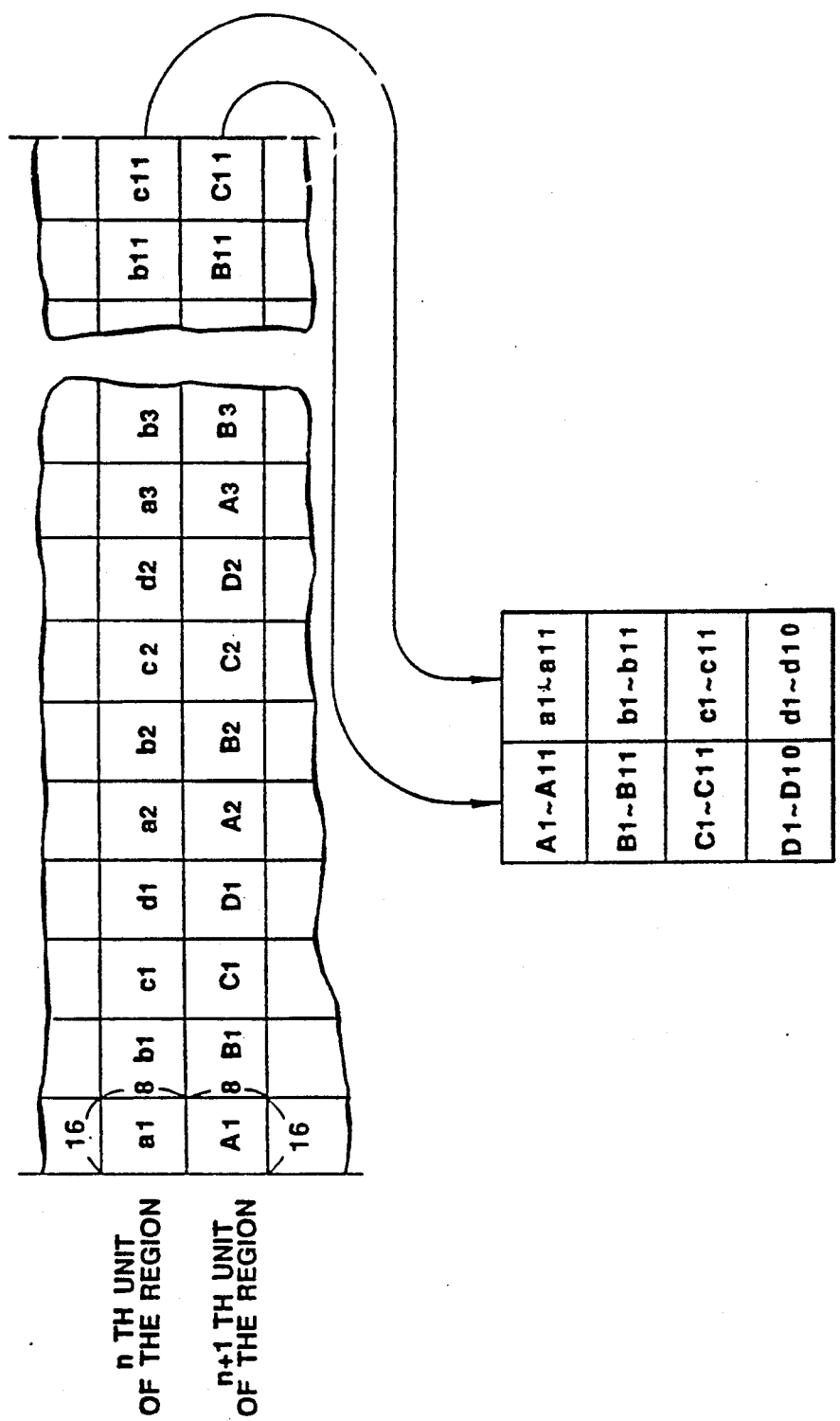
Figure 4:
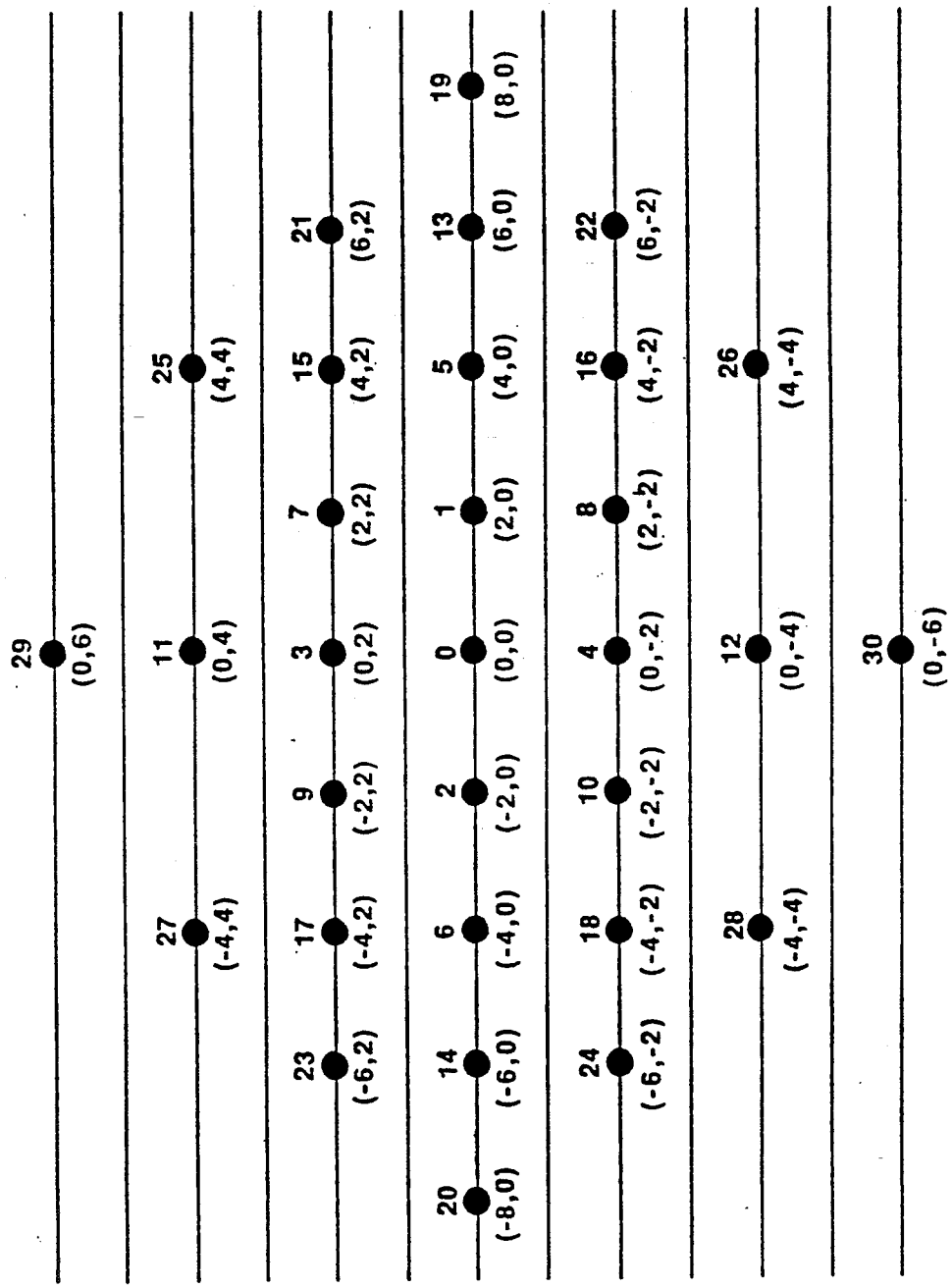

FIG. 1 is a block diagram of the preferred embodiment of a motion detecting circuit according to the present invention;

FIGS. 2 is an explanatory illustration showing video image regions for which a motion vector is detected;

FIG. 3 is a table showing the relationship between an input side buffer and a memory bank; and FIG. 4 is a layout of a motion vector generated by the motion detecting circuit of the invention.

DESCRIPTION OF THE PREFERRED EMBODIMENT

Referring now to the drawings, FIG. 2 shows regions for which motion vectors are to be detected. FIG. 2 shows motion vector detecting regions in video images having 60 Hz, 525 horizontal scanning lines and 50 Hz, 625 horizontal scanning lines. In either case, each 8 scanning lines of video data forms one unit process region. Therefore, each field has 30 and 35 unit process regions. Each unit process region is separated per every 16 pixels to form unit blocks. Therefore, in each process region, 43 unit blocks are formed.

FIG. 1 shows, in the form of a block diagram, the preferred embodiment of a motion detecting circuit according to the present invention. The motion detecting circuit has an input side buffer 1 for which a current frame picture data and one frame delayed picture data are input. The input side buffer 1 has a memory block 2 for storing the current frame picture data and a memory block 3 for storing one frame delayed picture data. Therefore, the current frame picture data is input to the memory block 2 and the one frame delayed picture data is input to the memory block 3. Each of the memory blocks 2 and 3 is separated into two memory areas 4 and 5, respectively, hereafter referred to as the "A memory area" and the "B memory area". Writing and reading data in and from the A and B memory areas 4 and 5 can be controlled independently of each other. Each of the memory areas 4 and 5 are constituted with four memory banks A2 to A4 and B1 to B4. Writing data in the memory banks A2 to A4 and B1 to B4 is controlled by a controller 7 which will be hereafter referred to as the "B controller". The B controller 7 produces a writing control signal for controlling write timing in the memory banks A1 to A4 and B1 to B4. On the other hand, reading data from the memory banks A1 to A4 and B1 to B4 is controlled by a controller 6 which will be hereafter referred to as the "A controller". The A controller 6 supplies the reading control signal. The writing and reading control signals are fed to an address change-over circuit 8. The address change-over circuit 8 selectively feeds the writing and reading control signals to the A and B memory banks A1 to A4, B1 to B4. The address change-over circuit 8 operates in such a manner that when the reading control signal is fed to the A memory blanks A1 to A4 for operating in read mode, the writing control signal is supplied to the B memory banks B1 to B4 for operating in write mode, thereby to write the picture data read out from the A memory banks into the B memory banks. In the alternative, while the A memory banks receive the write control signal to operate in write mode, the reading control signal is fed to the B memory banks for operating in read mode. Therefore, while the A memory banks are updated by newly input picture data, the address change-over circuit 8 is controlled by a switching control signal supplied from the B controller 7. The B controller 7 issues the switching control signal at every eight horizontal scanning lines. Accordingly, the operational modes are switched between write mode and read mode at the start of every unit process region.

For the B controller 7, a synchronization signal is supplied. The B controller 7 is responsive to the synchronization signal to derive a writing address from a ROM. As seen from FIG. 3, the writing addresses are set for storing picture data of respective unit blocks in randomly selected unit process regions, in the A and B memory banks in order. On the other hand, the A controller 6 derives its reading address from a ROM. The reading address is set in such a manner that pixel data at reference points (32 points) of the current frame picture data and the pixel data of the corresponding reference points of the one frame of delayed picture data can be read out. Therefore, in the shown embodiment, thirty variations of picture data can be read out.

FIG. 4 shows layout of motion vectors set in relation to the center point 0(0, 0). By this, the one frame of delayed picture data, with an offset relative to the current frame picture data, in a magnitude corresponding to the motion vectors between the corresponding reference points, can be read out. The picture data in the memory banks A2 to A4 and B1 to B4 of the memory blocks 2 and 3 are read out and fed to four arithmetic stages 9, 10, 11 and 12. Each of the arithmetic stages 9, 10, 11 and 12 performs arithmetic operation for deriving the motion vectors by way of block matching. As can be seen from FIG. 1, each of the four arithmetic stages 9, 10, 11 and 12 comprises an absolute differential value calculating circuit 13, an accumulating circuit 14 and a minimum value detecting circuit 15. The absolute differential value calculating circuit 13 performs the following process for deriving the motion vector.

Assuming that the coordination of the reference point (32 points/unit block) in the No. f field is If(xk, yk), and the motion vector is expressed by (dx1 dy1), the absolute differential value |dk| is derived through the following equation:

$$dk = |If(xk, yk)| - |If-2(xk-dx1, yk-dy1)| (1 \leq i \leq 30)$$

The absolute differential value calculating circuit 13 outputs the absolute differential value |dk| to the accumulating circuit 14. The accumulating circuit 14 derives a sum S1 by integrating the absolute differential value. Then, the accumulating circuit 14 feeds the sum data S1 to the minimum value detecting circuit 15. The minimum value detecting circuit selects the sum data S1 having the minimum value for detecting the minimum motion vector (Ve = MIN(S1)). The minimum value detecting circuit 15 derives code data which is illustrated by dots on FIG. 4 in the form of 5 bits of digital data. The process of the foregoing arithmetic stages 9, 10, 11 and 12 is controlled by clock pulses generated by the A controller 6.

The output of the minimum value detecting circuits 15 of the arithmetic stages 9, 10, 11 and 12 are fed to a multiplexer 16. The multiplexer 16 receives a switching signal from the A controller 6 for selecting one of the inputs from the arithmetic stages 9, 10, 11 and 12 to feed to an output side buffer 17.

The output side buffer 17 has memory areas 18 and 19 respectively referred to as the "C memory area" and the "D memory area" which can be controlled independently. Writing for the C and D memory areas 18 and 19 is controlled by writing control signal from the A controller 6 and reading of the data in the C and D memory areas is controlled by the reading control signal from the B controller 7. The writing control signal of the A controller 6 and the reading control signal of the B controller 7 are fed to an address change-over circuit 20. The address change-over circuit 20 selectively feeds the writing and reading control signals to the C and D memory areas 18 and 19. Similarly to the address change-over circuit 8 set forth above, the address change-over circuit 20 is so designed as to feed writing control signal to one of the C and D memory areas 18 and 19 and to feed the reading control signal to the other. In the shown embodiment, the address change-over circuit 20 is controlled by a switching signal from the B controller 7. The timing of the switching signal fed to the address change-over circuit 20 is synchronized with the switching signal for the address change-over circuit 8 from the A controller 6. The switching control signal for the address change-over circuit 20 is generated every eight horizontal lines. Therefore, for the memory area active in the write mode, the motion vector data for eight horizontal scanning lines forming one unit process region, can be written. On the other hand, the motion vector data stored in the memory area active in read mode is read out in synchronism with read timing of corresponding picture data.

The motion vector data has a delay for 16 horizontal scanning lines in relation to the current frame picture data. Therefore, the television signal is provided delayed for 16 horizontal scanning lines, so the television signal is synchronized with the motion vector data.

The operation of the foregoing motion detecting circuit will be discussed herebelow in order to facilitate better understanding of the invention.

In the shown construction, the current frame picture data and the one frame delayed picture data are synchronously input to the input side buffer 1. Assuming that the picture data in the No. n unit process region becomes as illustrated in FIG. 3 is written in the B memory area 5, the picture data in the No. n+1 unit process region is written in the A memory area 4. By repeatedly writing picture data of each unit process regions in order, all picture data is written in the input side buffer 1.

While the picture data of No. n+1 unit process region is written in, the picture data of No. n unit process region in the B memory area 5 is read out to the arithmetic stages 9, 10, 11 and 12. Thus, the motion vector of each unit process region is derived. Then, the motion vector data thus derived through the arithmetic stages 9, 10, 11 and 12 are fed to the D memory area 19 of the output side buffer 17. Subsequently, the picture data of No. n+2 unit process region is written in the B memory area During the period in which writing of the picture data of No. n+2 unit process region, the picture data of the No. n+1 unit process region is read out and fed to the arithmetic stages 9, 10, 11 and 12, and the motion vector data derived with respect thereto is fed to the C memory area 18 of the output side buffer 17. During the period, in which the motion vector data of No. n+1 unit process region is written in the C memory area 18, the motion vector data of No. n unit process region stored in the D memory area 19 is read out in synchronism with the television signal delayed for 16 horizontal scanning lines. Therefore, for every 16 horizontal scanning line period, the motion vector is derived. In the shown embodiment, since the four arithmetic stages operate in parallel to each other for deriving the motion vector, the required process speed for deriving the motion vector becomes one fourth of the conventional system. As can be appreciated, the number of the arithmetic stages is not limited to four as illustrated but can be selected according to the process speed of the TTL circuit to be employed.

As can be appreciated, the present invention fulfills all of the objects and advantages sought therefor.

While the present invention has been discussed in terms of the preferred embodiment of the present invention in order to facilitate a better understanding of the invention, the invention can be embodied in various fashion. Therefore, the invention should be appreciated to include all of the possible embodiments and modifications thereof, which can be implemented without departing from the principal of the invention as set out in the appended claims.

What is claimed is:

1. A motion detecting circuit for a video image comprising:
   a first buffer memory storing picture data of a current image, said picture data being separated into a plurality of first component data representative of plural current image segments;
   a second buffer memory storing picture data of a previous image, said picture data being separated into a plurality of second component data representative of plural previous image segments corresponding to said current image segments; and
   a plurality of arithmetic means for deriving a plurality of motion vectors for all of said segments, each of said arithmetic means receiving first component data and corresponding second component data for deriving vector data, and each of said arithmetic means receiving data representative of different individual segments.

2. A motion detecting circuit as set forth in claim 1, wherein each of said arithmetic means comprises an absolute differential value calculating means, an accumulating circuit and a minimum value detecting circuit.

3. A motion detecting circuit as set forth in claim 1, wherein said first buffer memory stores data of the current frame image and said second buffer memory stores data of one frame delayed image.

4. A motion detecting circuit as set forth in claim 1, which further comprises a multiplexer connected to outputs of the plural arithmetic means, and an output buffer memory connected to the multiplexer.

5. A motion detecting circuit as set forth in claim 4, which further comprises a first address change-over circuit connected to said first and second buffer memories, for selectively controlling reading of data representative of one segment from said first and second buffer memories while simultaneously controlling writing of data representative of a different segment, and a second address change-over circuit connected to the output buffer memory for controlling reading and writing thereof.

6. A motion detecting circuit as set forth in claim 5, which further comprises a controller connected to said first and second change-over circuits, for selectively controlling reading and writing of said first and second and output buffer memories.

7. A motion detecting circuit as set forth in claim 6, wherein said controller is supplied with a synchronization signal which synchronizes operation of said first and second and output buffer memories with a video signal.

* * * * *